United States Patent Office 3,196,179
Patented July 20, 1965

3,196,179
PREPARATION OF CYCLOHEXYLAMINE BY HYDROGENATION OF ANILINE USING A RHODIUM CATALYST
Ralph M. Robinson, Waukegan, Ill., assignor to Abbott Laboratories, North Chicago, Ill., a corporation of Illinois
No Drawing. Filed Mar. 26, 1962, Ser. No. 182,612
5 Claims. (Cl. 260—563)

This application is a continuation-in-part of co-pending application Serial No. 777,850, filed December 3, 1958, and Serial No. 778,640, filed December 8, 1958, both now abandoned.

The present invention relates to a process for producing cyclohexylamine and more particularly to an improved process for producing cyclohexylamine which employs a rhodium catalyst.

It has been the experience of the hydrogenation field that when primary amine reductions are carried to completion objectionable quantities of secondary amines are formed. When catalysts such as nickel are used in high temperature and high pressure reactions, it is necessary to stop the reduction short of completion, and while substantial amounts of unreacted primary amine starting material remain in order to minimize formation of impurities. Ordinarily if such primary amine reductions are carried out to completion, rather than 80% completion for example, very high levels of so-called high boil impurities consisting largely of secondary amines will result.

Although rhodium has heretofore not been employed as a primary amine reduction catalyst, those using it with secondary amines have generally found it necessary to dissolve or suspend the reactants in solvents to check by-product formation. Although solvent suspension or dissolution may be required in these reactions it is economically undesirable because of the extra cost of solvent separation and because solvent dilution curtails the batch size which may be reacted in available equipment. Those using rhodium have also studiously avoided the hydrogenation of primary amines when secondary amine impurities are unacceptable.

In its efforts to avoid the foregoing disadvantages the art has been forced to adopt complex procedures to diminish by-product formation: aniline pretreatment with lead compounds before reduction (U.S. 2,184,070), use of special nickel-hydrolyzable metal alloy catalysts (U.S. 2,328,140) and levigation of carrier with soluble nickel compounds followed by reduction of the material to prepare a catalyst for reducing aromatic amines (U.S. 2,092,-525).

It is therefore an important object of this invention to provide a method for carrying primary amine reactions to 100% completion without producing objectionable levels of by-products. It is another object of the present invention to provide a more economical process for the production of cyclohexylamine. A further object of the present invention is to provide a process which produces economically high yields of cyclohexylamine from aniline. It is a still further object of the present invention to provide an improved catalytic process in which very high yields of cyclohexylamine are produced while requiring simplified production apparatus and procedure. Other objects of the invention will be apparent from the detailed description and claims to follow.

Accordingly, the present invention provides a catalytic hydrogenation method employing rhodium catalysts that result in the production of high yields of the primary amine cyclohexylamine which is substantially devoid of previously ubiquitous primary amine degradation products associated with such reactions.

It has been found that cyclohexylamine can be very economically produced by catalytically reducing aniline in a hydrogen atmosphere at low temperatures without obtaining substantial amounts of by-products or unreacted starting material. The reduction of aniline with an atmosphere of hydrogen in the presence of about 0.05% to 40% by weight of elemental rhodium on alumina wherein the rhodium comprises about 5% by weight of the alumina catalyst, or a similar amount of rhodium catalyst of lesser concentration, about 1% by weight for example, or an equivalent amount of rhodium oxide catalyst, is effected at temperatures between about 25° C. and 200° C. and at pressures of from about 5 to 10,000 pounds per square inch gauge pressure (p.s.i.g.) to give yields of cyclohexylamine in excess of 90% by weight of starting material. Because of the wide pressure range which may suitably be employed, preferred conditions for a particular system will ordinarily be dictated by the type of equipment used, required reaction speed and whether a batch or continuous process is desired. In a low temperature and high pressure embodiment, the reduction of aniline is carried out at a temperature of about 50° C. and at a hydrogen pressure of about 1500 p.s.i.g. for a time interval necessary to cause a substantial amount of aniline starting material to react with six equivalents of hydrogen, the stoichiometric requirement.

In a low temperature and low pressure embodiment, the reduction is carried out at a temperature of about 50° C. and at a hydrogen pressure of between about 15 to 60 p.s.i.g. until the stoichiometric equivalent of hydrogen is taken up by the aniline. In both the high and low pressure embodiments, higher temperatures may be employed if desired, although if temperatures of over 200° C. are used, objectionable levels of by-products will begin to be formed and it is therefore advisable to maintain the maximum reaction temperature below 200° C., and optimally to maintain it in the neighborhood of 150° C.

As the pressure of hydrogen is increased the time required to complete the reaction is materially reduced, a fact important if it is desired to make the reaction continuous as is possible with the high pressure embodiment. Thus, when the pressure in the reaction zone is maintained between 1800 and 2000 p.s.i.g. during a substantial portion of the reaction, the time required for completion of the reaction is about one-tenth as long as when the hydrogen pressure is between 15 and 60 pounds, all other conditions being the same.

Varying concentrations of rhodium catalyst can be used in the reaction and as the concentration of catalyst is increased, the time of reaction is generally somewhat reduced. Thus, where the 5% elemental rhodium metal on alumina catalyst is used at a weight percent concentration of 40%, the time of reaction is about half that when 10% of the said catalyst is used, all other reaction conditions remaining constant. High yields of cyclohexylamine are also produced, however, when only 1.5% of the said catalyst is used. It is also of great commercial importance that the rhodium catalyst in the instant reaction can be reused for many runs and can also be readily reactivated by conventional means after any of the various reaction conditions employed therein and without requiring the addition of any agents to the reaction mixture.

The following specific examples are for the purpose of illustrating the improved process and should not be construed as restricting the invention to the precise conditions described.

*Example I*

Aniline (50 cc.) free of metallic impurities is mixed with 5 gm. of 5% rhodium metal on alumina powder in a low pressure closed container, such as a Parr reaction bottle. The reaction bottle is connected to a hydrogenation apparatus, and after purging to free the system of air, the hydrogen pressure is raised to 28 p.s.i.g. The reaction bottle is shaken as the temperature is raised to 45° C. within about 30 minutes and shaking is continued during the course of the reaction. As the reaction proceeds, the hydrogen pressure drops from the initial pressure of 28 p.s.i.g. to 7 p.s.i.g., whereupon the pressure is raised to 28 p.s.i.g. as frequently as required until no further pressure drop is observed. When the reaction is completed after about 14 hours under the foregoing conditions, the hydrogen is removed and the catalyst separated from the product solution which on chemical analysis is found to contain 96.8% cyclohexylamine, about 3% dicyclohexylamine and a negligible amount of aniline.

*Example II*

Aniline (24.8 gm.) free of metal impurities and 10 gm. of 5% rhodium on alumina powder are placed in a high pressure autoclave. After purging all air, hydrogen pressure in the autoclave is adjusted to 1800 p.s.i.g. at 25° C., the reaction is allowed to proceed with the following results:

| Total Elapsed Time (Minutes) | Temperature (°C.) | Pressure (p.s.i.g.) |
|---|---|---|
| 0 | 25 | 1,800 |
| 30 | 45 | 1,200 |
| 45 | 50 | 940 |
| 55 | 48 | 850 |
| 80 | 45 | 800 |

Although the reaction apparently is substantially complete after about 50 minutes of reaction time, the autoclave was cooled after 80 minutes and the catalyst was filtered to recover the product. On chemical analysis the product is found to contain 96.2% cyclohexylamine, 3.7% dicyclohexylamine and a negligible amount of aniline.

*Example III*

Aniline (50 cc.) free of metallic impurities is mixed with 20 gm. of 5% rhodium metal on alumina powder in a lower pressure closed container, such as a Parr reaction bottle. The reaction bottle is connected to a hydrogenation apparatus, and after purging to free the system of air, the hydrogen pressure is raised to 28 p.s.i.g. The reaction bottle is shaken as the temperature is raised to 46° C. within about 30 minutes and shaking is continued during the course of the reaction. As the reaction proceeds, the hydrogen pressure drops from the initial pressure of 28 p.s.i.g. to 7 p.s.i.g., whereupon the pressure is raised to 28 p.s.i.g. as frequently as required until no further pressure drop is observed. When the reaction is completed after about 8 hours under the foregoing conditions, the hydrogen is removed and the catalyst separated from the product solution which on chemical analysis is found to contain 96.5% cyclohexylamine, about 3.3% dicyclohexylamine and a negligible amount of aniline.

*Example IV*

The high pressure conditions of Example II were repeated using the same amounts of reactants, catalyst and pressure, but allowing the reaction temperature to remain at room temperature (25° C.). After 90 minutes, the catalyst was filtered to recover the product which on chemical analysis is found to contain 97.5% cyclohexylamine, 2.4% dicyclohexylamine and no aniline.

*Example V*

Aniline (50 cc.) free of metallic impurities is mixed with 2.5 gm. of 5% rhodium metal on alumina powder in a low pressure closed container, such as a Parr reaction bottle. The reaction bottle is connected to a hydrogenation apparatus, and after purging to free the system of air, the hydrogen pressure is raised to 60 p.s.i.g. The reaction bottle is shaken as the temperature is raised to 50° C. within about 30 minutes and shaking is continued during the course of the reaction. As the reaction proceeds, the hydrogen pressure drops from the initial pressure of 60 p.s.i.g. to 15 p.s.i.g., whereupon the pressure is raised to 60 p.s.i.g. as frequently as required until no further pressure drop is observed. When the reaction is completed after about 12 hours under the foregoing conditions, the hydrogen is removed and the catalyst separated from the product solution which on chemical analysis is found to contain 96.9% cyclohexylamine, about 2.9% dicyclohexylamine and a negligible amount of aniline.

*Example VI*

Aniline (50 cc.) free of metallic impurities is mixed with 2.5 gm. of 5% rhodium metal on alumina powder in a low pressure closed container, such as a Parr reaction bottle. The reaction bottle is connected to a hydrogenation apparatus, and after purging to free the system of air, the hydrogen pressure is raised to 60 p.s.i.g. The reaction bottle is shaken as the temperature is raised to 90° C. within about 30 minutes and shaking is continued during the course of the reaction. As the reaction proceeds, the hydrogen pressure drops from the initial pressure of 60 p.s.i.g. to 18 p.s.i.g., whereupon the pressure is raised to 60 p.s.i.g. as frequently as required until no further pressure drop is observed. When the reaction is completed after about 8 hours under the foregoing conditions, the hydrogen is removed and the catalyst separated from the product solution which on chemical analysis is found to contain 97.6% cyclohexylamine, about 2.2% dicyclohexylamine and a negligible amount of aniline.

Others may readily adapt the invention for use under various conditions of service, by employing one or more of the novel features disclosed or equivalents thereof. As at present advised with respect to the apparent scope of my invention, I desire to claim the following subject matter.

I claim:

1. In a process for preparing cyclohexylamine, the step which consists of reacting aniline with approximately six equivalents of hydrogen in the presence of a supported rhodium catalyst within a reaction zone maintained at a hydrogen pressure of above about five pounds per square inch gauge and at a temperature between about 25° C. and 200° C.

2. In a process for preparing cyclohexylamine, the step of claim 1 wherein the aniline is reductively reacted with hydrogen in the presence of 0.05% to 40% by weight of elemental rhodium on an inert carrier in which the rhodium comprises from about 0.1% to 5% by weight of the carrier.

3. In a process for preparing cyclohexylamine, the step consisting of reductively reacting aniline with hydrogen in the presence of a supported rhodium catalyst within a pressurized hydrogen reaction zone maintained at pressures between about 15 p.s.i. and 10,000 p.s.i. and temperatures of between about 25° C. and 150° C. until approximately six equivalents of hydrogen are reacted with the aniline.

4. In a high pressure continuous process of producing cyclohexylamine, the steps of reductively reacting aniline with hydrogen in the presence of a catalyst comprising elemental rhodium on an inert carrier, said reaction being carried out in a pressurized reaction zone maintained at a hydrogen pressure of about 2500 pounds per square inch and at a temperature of about 100° C. for a period not exceeding about 30 minutes and separating the catalyst from the cyclohexylamine.

5. In a low pressure process for producing cyclohexylamine, the steps consisting of reductively reacting aniline with hydrogen in the presence of a catalyst comprising elemental rhodium on an inert carrier, said reaction being carried out in a pressurized reaction zone maintained at a hydrogen pressure of about 60 pounds per square inch and at a temperature of between about 50° C. and 90° C. for a period of between about 6 to 14 hours, and separating the catalyst from the cyclohexylamine.

References Cited by the Examiner

UNITED STATES PATENTS

| | | | |
|---|---|---|---|
| 1,927,129 | 9/33 | Lommel et al. | 260—563 |
| 2,092,525 | 9/37 | Adkins et al. | 260—563 |
| 2,675,390 | 4/54 | Rosenblatt. | |
| 3,117,992 | 1/64 | Duggan | 260—563 |

FOREIGN PATENTS 305,507  2/29  Great Britain.

OTHER REFERENCES

Farkas, "Advances in Catalysis," vol. IX, pp. 716–742.
Hiers et al., C. A., vol. 20, pp. 1599–1600 (1926).
Lommel et al., C. A., vol. 23, pp. 1420–1421 (1929).
Zelinsky et al., Ber. Deut. Chem., vol. 58, pp. 1298–1303 (1925).

CHARLES B. PARKER, *Primary Examiner*.

LEON ZITVER, *Examiner*.